US009217466B2

(12) United States Patent
Ng

(10) Patent No.: US 9,217,466 B2
(45) Date of Patent: Dec. 22, 2015

(54) LINEAR MOTION BEARING SYSTEM WITH SELF-ALIGNING RAIL

(75) Inventor: Alison Ng, New York, NY (US)

(73) Assignee: THOMSON INDUSTRIES, INC., Amherst, NY (US)

( * ) Notice: Subject to any disclaimer, the term of this patent is extended or adjusted under 35 U.S.C. 154(b) by 0 days.

(21) Appl. No.: 13/812,608

(22) PCT Filed: Jul. 27, 2011

(86) PCT No.: PCT/US2011/045478
§ 371 (c)(1),
(2), (4) Date: Apr. 5, 2013

(87) PCT Pub. No.: WO2012/015881
PCT Pub. Date: Feb. 2, 2012

(65) Prior Publication Data
US 2014/0147062 A1  May 29, 2014

Related U.S. Application Data

(60) Provisional application No. 61/368,404, filed on Jul. 28, 2010.

(51) Int. Cl.
| F16C 29/04 | (2006.01) |
| F16C 23/06 | (2006.01) |
| F16C 43/04 | (2006.01) |
| F16C 29/06 | (2006.01) |
| F16C 19/54 | (2006.01) |

(52) U.S. Cl.
CPC ............. *F16C 23/06* (2013.01); *F16C 29/0685* (2013.01); *F16C 43/04* (2013.01); *F16C 19/54* (2013.01); *Y10T 29/49696* (2015.01)

(58) Field of Classification Search
CPC .... F16C 29/0685; F16C 29/069; F16C 43/06; F16C 19/54; F16C 23/06
USPC ........ 384/7, 43–45, 49, 55–57; 464/168–169; 29/898.07
See application file for complete search history.

(56) References Cited

U.S. PATENT DOCUMENTS

| 2,628,135 | A | * | 2/1953 | Magee | 384/43 |
| 3,436,132 | A | * | 4/1969 | Wiesler | 384/43 |
| 3,545,826 | A | * | 12/1970 | Magee et al. | 384/43 |
| 3,767,276 | A | * | 10/1973 | Henn | 384/43 |
| 4,227,751 | A | * | 10/1980 | Albert | 384/43 |
| 4,296,974 | A |   | 10/1981 | Teramachi | |
| 4,406,502 | A | * | 9/1983 | Teramachi | 384/45 |
| 4,433,875 | A | * | 2/1984 | Walter et al. | 384/49 |

(Continued)

*Primary Examiner* — Marcus Charles
(74) *Attorney, Agent, or Firm* — Dilworth & Barrese, LLP.

(57) ABSTRACT

A linear motion bearing system comprising a rolling element retainer structure having at least a portion of a plurality of open axial rolling element tracks formed therein. The rolling element tracks including an open load-bearing portion, an open return portion and turnarounds interconnecting the load bearing and return portions. A plurality of bearing rolling elements are disposed in the rolling element tracks. A plurality of load bearing outer races are axially positioned adjacent the rolling element retainer structure for receiving load from the rolling elements disposed in the load-bearing portion of the rolling element tracks. An outer housing sleeve is effective to hold the rolling element retainer structure. A rail is effective to mate with the rolling element retainer structure, the rail including at least one recess sized and shaped so as to be mateable with at least one of the bearing rolling elements.

15 Claims, 8 Drawing Sheets

(56) References Cited

U.S. PATENT DOCUMENTS

| | | | |
|---|---|---|---|
| 4,469,380 A * | 9/1984 | Cowles, Sr. | 384/43 |
| 4,496,197 A | 1/1985 | Kwon | |
| 4,515,413 A | 5/1985 | Teramachi | |
| 4,531,788 A * | 7/1985 | Teramachi | 384/45 |
| 5,046,862 A * | 9/1991 | Ng | 384/43 |
| 5,201,584 A * | 4/1993 | Simons | 384/49 |
| 5,207,510 A * | 5/1993 | Polyak | 384/43 |
| 5,346,313 A * | 9/1994 | Ng | 384/43 |
| 5,431,498 A * | 7/1995 | Lyon | 384/45 |
| 5,558,442 A * | 9/1996 | Ng | 384/43 |
| 6,343,993 B1 * | 2/2002 | Duval et al. | 464/167 |
| 6,350,203 B1 * | 2/2002 | Zernickel | 464/167 |
| 6,588,289 B2 * | 7/2003 | Ung et al. | 74/89.4 |
| 6,609,304 B1 | 8/2003 | Mishler | |
| 6,805,637 B2 * | 10/2004 | Daenzer et al. | 464/168 |
| 6,948,401 B2 * | 9/2005 | Zernickel et al. | 74/493 |
| 8,298,093 B2 * | 10/2012 | Kwon et al. | 464/167 |
| 8,317,397 B2 * | 11/2012 | Klein | 384/43 |
| 2008/0107365 A1 * | 5/2008 | Mueller | 384/44 |
| 2008/0152268 A1 | 6/2008 | Mueller | |

* cited by examiner

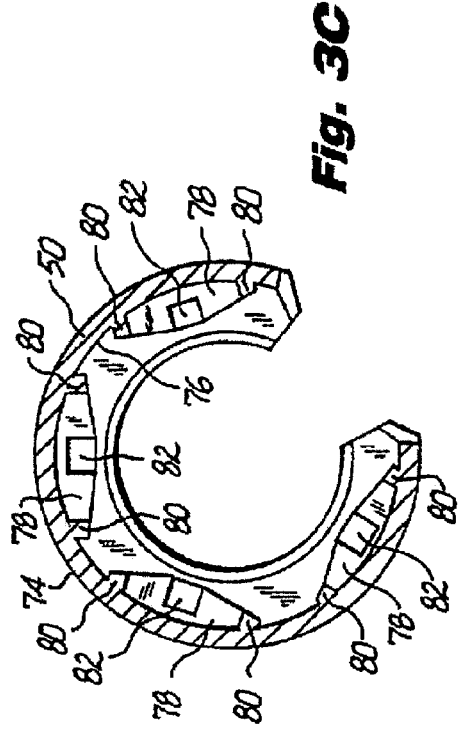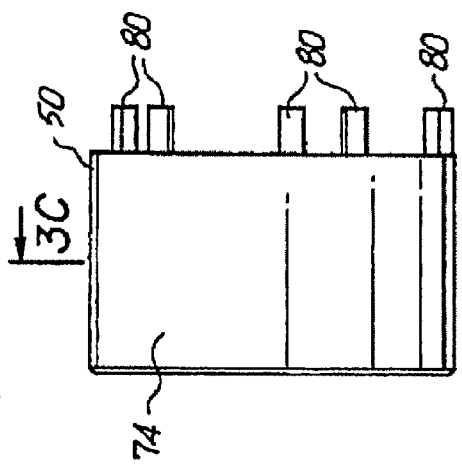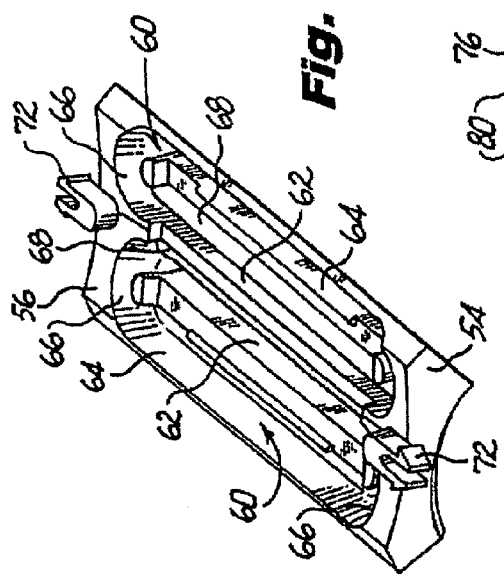

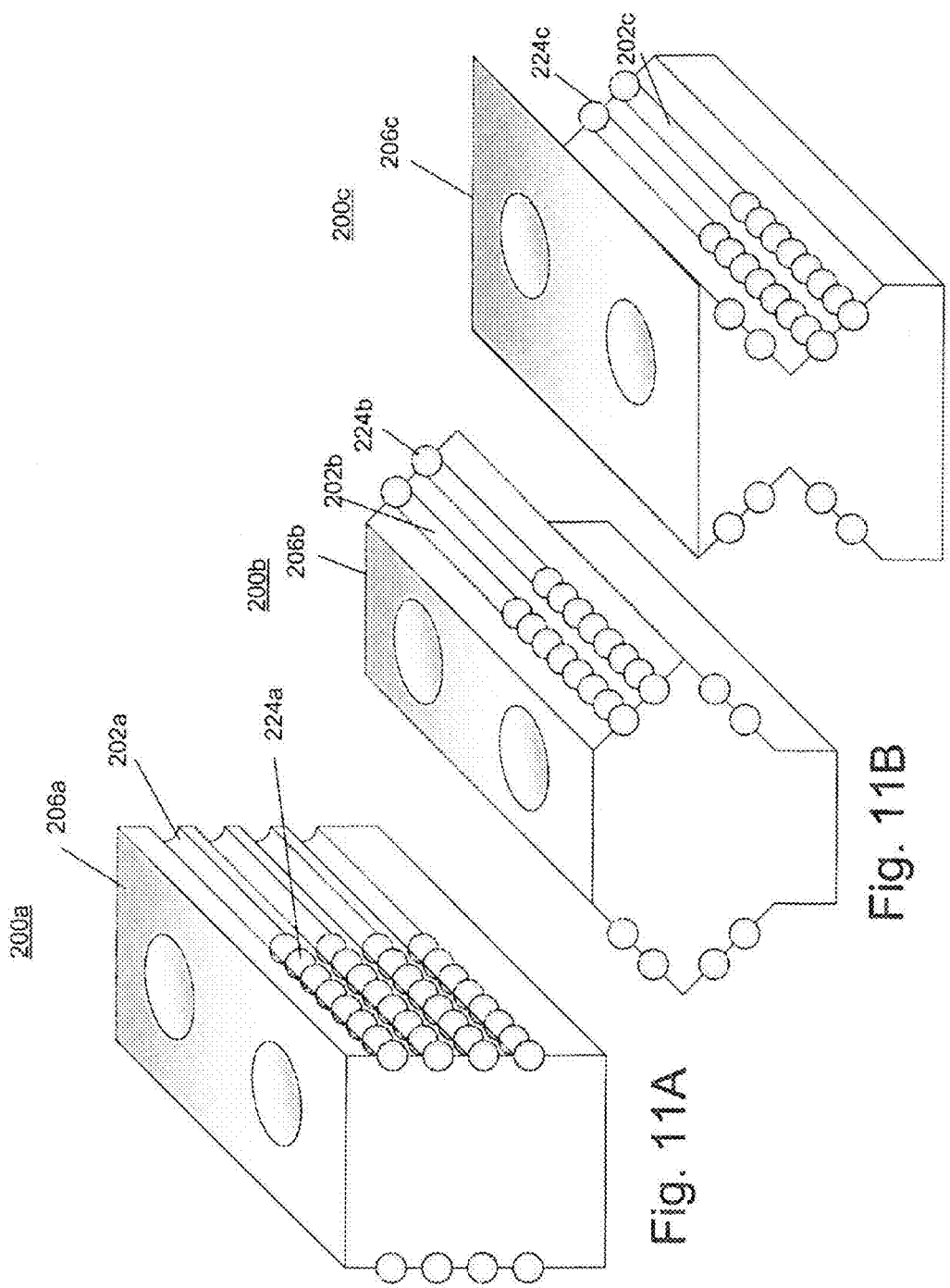

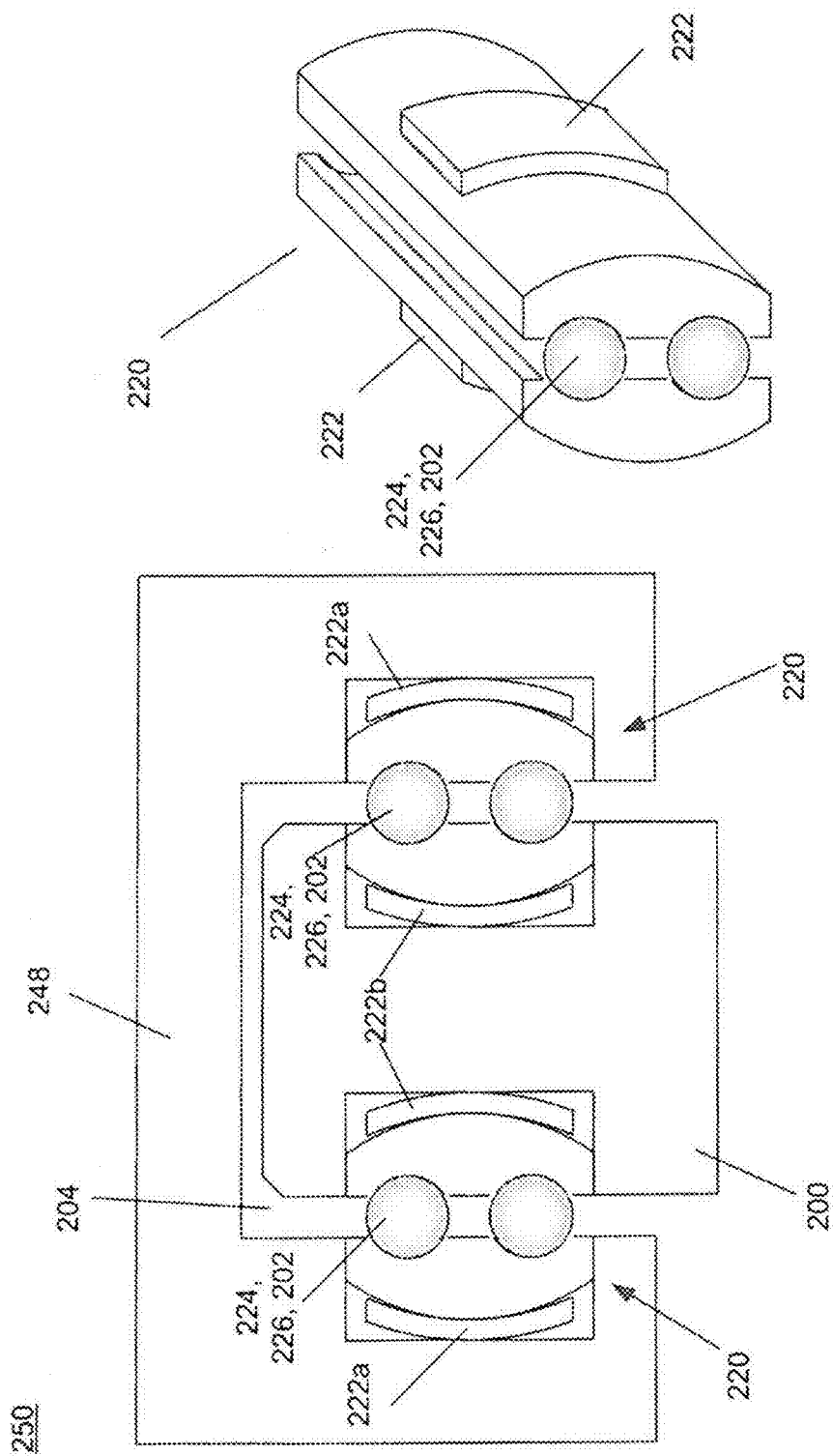

LINEAR MOTION BEARING SYSTEM WITH SELF-ALIGNING RAIL

CROSS REFERENCE TO RELATED APPLICATIONS

This application claims priority to provisional application No. 61/368,404 filed Jul. 28, 2010 entitled "LINEAR MOTION BEARING SYSTEM WITH SELF-ALIGNING RAIL", the entirety of which is hereby incorporated by reference.

BACKGROUND OF THE INVENTION

1. Field of the Invention
This disclosure relates to a linear bearing and rail.
2. Description of the Related Art
In a linear motion bearing, a generally cylindrical housing is designed to move relative to a rail. The housing includes a rolling element retaining structure comprising a plurality of rolling element-retaining segments. Each rolling element-retaining segment includes a plurality of bearing rolling elements moveable in a track. The segments are mounted within the housing so that movement of the housing with respect to the shaft is effectuated through engagement of the bearings with the rail. As the housing moves, the bearing rolling elements move in respective tracks. This disclosure describes an improvement on these prior art systems.

SUMMARY OF THE INVENTION

One embodiment of the invention is a linear motion bearing system. The linear motion bearing system may comprise a rolling element retainer structure having at least a portion of a plurality of open axial rolling element tracks formed therein, said rolling element tracks including an open load bearing portion, an open return portion and turnarounds interconnecting the load bearing and return portions. The linear motion bearing system may further comprise a plurality of bearing rolling elements disposed in the rolling element tracks. The linear motion bearing system may further comprise a plurality of load bearing outer races axially positioned adjacent the rolling element retainer structure, the load bearing outer races effective to receive load from the rolling elements disposed in the load bearing portion of the rolling element tracks. The linear motion bearing system may further comprise an outer housing sleeve effective to hold the rolling element retainer structure. The linear motion bearing system may further comprise a rail effective to mate with the rolling element retainer structure, the rail including at least one recess sized and shaped so as to be mateable with at least one of the bearing rolling elements.

Another embodiment of the invention is a linear motion bearing system. The linear motion bearing system may comprise a rolling element retainer structure having at least a portion of a plurality of open axial rolling element tracks formed therein, said rolling element tracks including an open load bearing portion, an open return portion and turnarounds interconnecting the load bearing and return portions. The linear motion bearing system may further comprise a plurality of bearing rolling elements disposed in the rolling element tracks. The linear motion bearing system may further comprise a plurality of load bearing outer races axially positioned adjacent the rolling element retainer structure, the load bearing outer races effective to receive load from the rolling elements disposed in the load bearing portion of the rolling element tracks. The linear motion bearing system may further comprise an outer housing sleeve effective to hold the rolling element retainer structure. The linear motion bearing system may further comprise a rail effective to mate with the rolling element retainer structure, the rail including at least one recess sized and shaped so as to be mateable with at least one of the bearing rolling elements and a base portion effective to mate with the rolling element retainer structure. The base portion may include at least one of a rectangular solid, a diamond cross-section, an hourglass cross-section, a cylindrical configuration, or a spline configuration. The recess may have a half-circle cross-section and extend along a length of the rail. The radius and circumference of the recess may correspond to a radius and circumference of the bearing rolling elements. The recess may have a half-cylinder shape.

Another embodiment of the invention is a method for assembling a linear motion bearing system. The method may comprise placing an outer housing sleeve circumferentially around a rolling element retainer structure, the rolling element retainer structure having at least a portion of a plurality of open axial rolling element tracks formed therein, the rolling element tracks including an open load bearing portion, an open return portion and turnarounds interconnecting the load bearing and return portions. The method may further comprise placing a plurality of bearing rolling elements in the rolling element tracks. The method may further comprise placing a plurality of load bearing outer races axially adjacent the rolling element retainer structure, the load bearing outer races effective to receive a load from the rolling elements disposed in the load bearing portion of the rolling element tracks. The method may further comprise mating the rolling element retainer structure with a rail, the rail including at least one recess sized and shaped so as to be mateable with at least one of the bearing rolling elements.

BRIEF DESCRIPTION OF THE DRAWINGS

The drawings constitute a part of the specification and include exemplary embodiments of the present invention and illustrate various objects and features thereof.

FIG. 2 is a perspective view of a rolling element retainer segment;

FIG. 3A is a perspective view of a sleeve portion of the outer housing of the linear motion bearing assembly of FIG. 1.

FIG. 3B is a side view of the sleeve portion of FIG. 3A.

FIG. 3C is a cross-sectional view taken along line 3C-3C in FIG. 3B of the sleeve portion of FIG. 3A.

FIGS. 11A, 11B, and 11C are perspective view of rails, which could be used in accordance with an embodiment of the disclosure."

FIG. 12A is a plan view of a rail and linear motion bearing assembly and FIG. 12B is a perspective view of a linear motion bearing assembly in accordance with an embodiment of the disclosure.

DETAILED DESCRIPTION OF THE PREFERRED EMBODIMENT(S)

Figure 1:
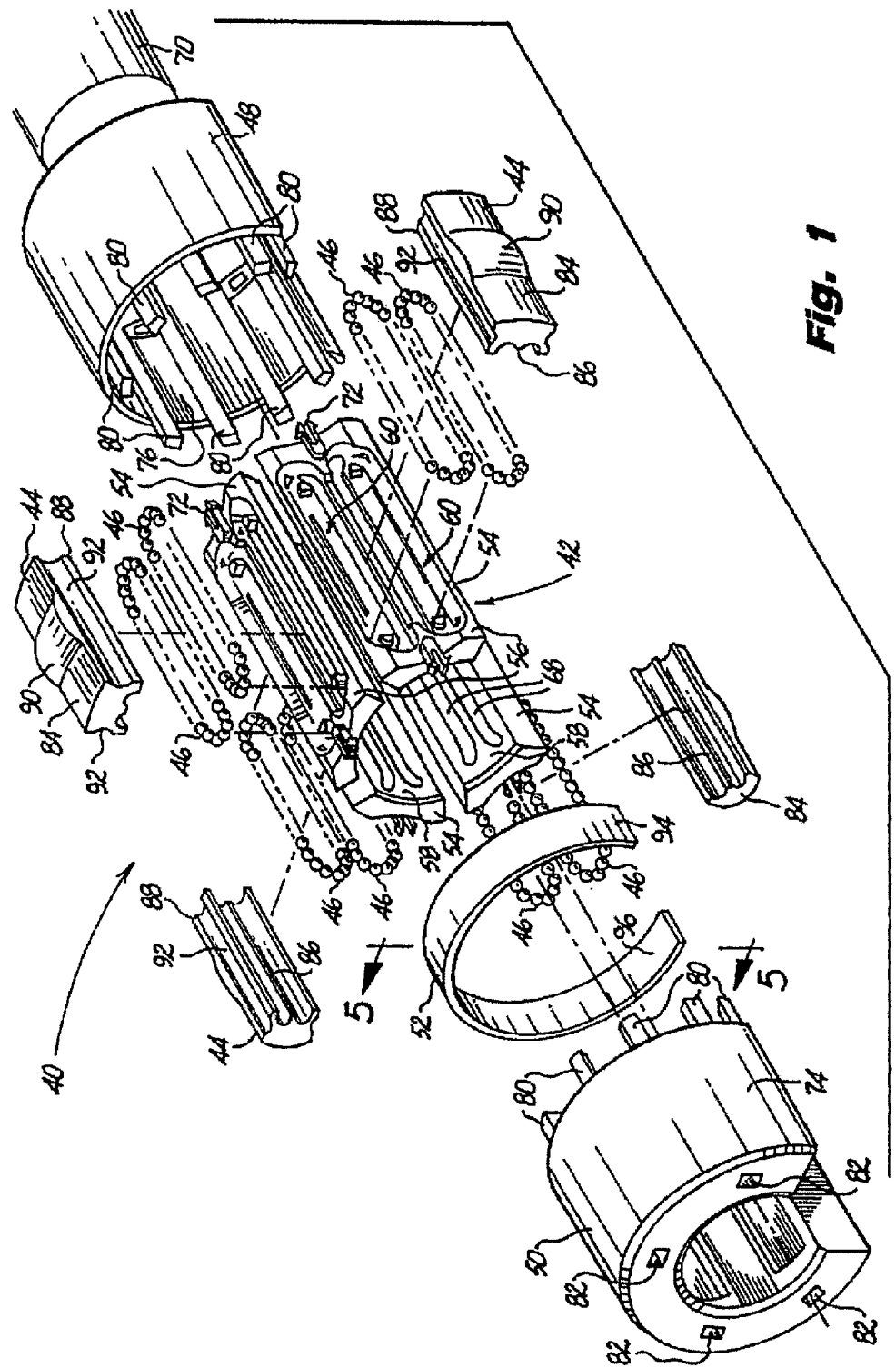
FIG. 1 is an exploded perspective view of a linear motion bearing assembly.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring to FIGS. 1-6, there is shown a linear motion open-type bearing assembly 40. The bearing assembly includes rolling element retainer structure, shown generally at 42, load-bearing outer races 44, bearing rolling elements 46, outer housing sleeves 48, 50 and a bearing outer race to housing intermediary load structure 52. Rolling elements 46 could include, for example, balls, rollers (cylindrical, spherical, concavex, etc.), ellipsoids, diamond shaped rollers, etc. Outer race 44 could be conformal or non-conformal.

Focusing on FIG. 2, rolling element retainer structure 42, in one example, comprises four rolling element retainer segments 54, each operatively associated with adjacent rolling element retainer segments along longitudinal sides thereof to form a polygonally shaped rolling element retainer structure having a bore there through for receiving a shaft 70. Each rolling element retainer segment 54 includes an outer radial surface 56 and an inner radial surface 58. Axial rolling element tracks 60 are formed in the outer radial surface 56 of each rolling element retainer segment 54 and include load bearing portions 62, return portions 64 and turnarounds 66. The load bearing and return portions of the rolling element tracks in this embodiment are undercut to facilitate loading and retention of the bearing rolling elements 46 therein. This also eliminates the need for a separate retainer structure to keep the bearing rolling elements in the rolling element tracks. A longitudinal bore 68 in the inner radial surface 58 of the rolling element retainer segment 54 extends substantially the length of the load bearing portions 62 and accesses shaft 70. Although shaft 70 is illustrated as a substantially cylindrical shaft, support members of other configurations may also be used.

A plurality of bearing rolling elements 46 are disposed in the rolling element tracks 60 with those bearing rolling elements 46 in the load bearing tracks 62 extending at least partially into longitudinal bores 68 to contact support shaft 70. In this embodiment, a pair of axial rolling element tracks 60 are formed in each outer radial surface 56 of the rolling element retainer segment with the corresponding load bearing tracks being oriented in substantially parallel adjacent relation. This orientation facilitates enhanced load capacity and maximizes space utilization for a more compact and efficient bearing rolling element arrangement. A locking structure in the form of locking clips 72 are formed on opposing longitudinal ends of each rolling element retainer segment 54 to facilitate assembly with outer housing sleeves 48, 50, discussed in greater detail herein below.

Referring now to FIGS. 1 and 3A-C, the linear motion bearing assembly in accordance with one preferred embodiment includes a pair of outer housing sleeves 48, 50 which, when assembled serve to close and protect the exposed outer radial surfaces 56 of rolling element retainer structure 42.

The outer radial surface 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing outer races 44 therein. These mounting surfaces 78 further include extension portions 80 which define a mounting space for bearing outer race to housing intermediary load structure 52, described in greater detail below. Mounting surfaces 78 may be recessed from outer radial surface 74 by a distance approximating the cross-sectional radial thickness of bearing outer race to housing intermediary load structure 52. In this manner, the outer housing sleeves 48, 50 and the bearing outer race to housing intermediary load structure 52 combine to form a relatively smooth and uniform outer radial surface of the linear motion bearing assembly 40. See, FIG. 6.

In this embodiment, mounting surfaces 78 are configured to fit the shape of individual rolling element retainer segments 54. A plurality of locking bores 82 are formed in respective ends of sleeves 48, 50 in alignment with locking clips 72 of rolling element retainer segments 54. Thus, when the rolling element retainer segments 54 are assembled into the sleeves 48, 50, locking clip 72 extends into respective locking bores 82 and assists in holding linear motion bearing assembly 40 together.

Figure 4:
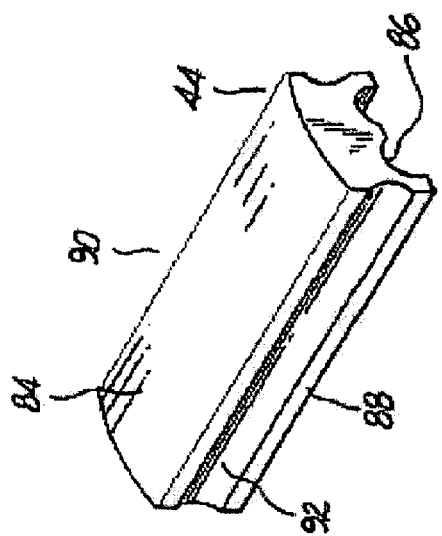
FIG. 4 is a perspective view of the load bearing outer race in accordance with the linear motion bearing assembly of FIG. 1.

Referring now to FIGS. 1 and 4, a plurality of individual load bearing outer races 44 are incorporated into the linear motion bearing assembly 40 and serve to receive load from the bearing rolling elements 46 in contact with shaft 70. In the embodiment of FIG. 4, load bearing outer race 44 is elongated along the longitudinal axis of the bearing assembly and includes an outer radial surface 84, an inner radial surface 86, and a pair of side wall surfaces 88. The outer radial surface 84 is substantially accurate and may include a crown portion 90 disposed on the outer radial surface 84 in a medial position. Crown portion 90 is configured and dimensioned to permit the load bearing outer races 44 to rock both circumferentially and longitudinally into and out of parallelism with the axes of the rolling element retainer structure 42.

The inner radial surface 86 of the load bearing outer race is advantageously provided with a pair of axial grooves, which serve as the upper surface of load bearing portions 62 of rolling element tracks 60. By providing a single load bearing outer race 44 for each pair of load bearing portions 62 in each outer radial surface 56, the linear motion bearing assembly 40 is easier to fabricate and assemble. Further, the bearing assembly has a high load bearing capacity.

In this embodiment, a longitudinal groove 92 is formed in each sidewall surface 88 of load bearing outer races 44. These grooves 92 make up a sidewall of the axial rolling element tracks 60 and guide bearing rolling elements 46 as they move through the return portion thereof.

Figure 5:
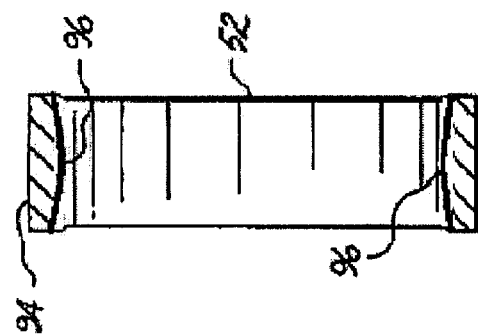
FIG. 5 is a cross-sectioned view of the bearing outer race to housing intermediary structure taken along line 5-5 of FIG. 1.
Figure 6:
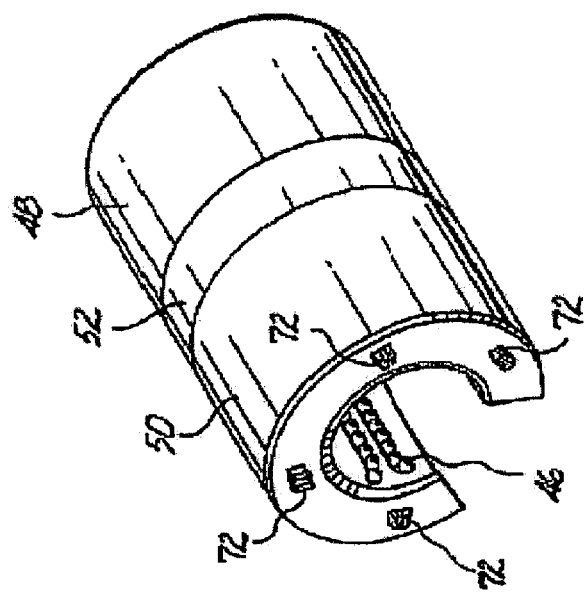
FIG. 6 is a perspective view of the assembled linear motion bearing assembly of FIG. 1.

Referring now to FIGS. 1, 5 and 6, bearing outer race to housing intermediary load structure 52 is illustrated in a C-ring configuration having an outer radial surface 94 conforming substantially in dimension to the outer radial surface 74 of sleeves 48, 50. In this embodiment, the inner radial surface 96 is arcuate to the outer radial surface and is configured and dimensioned, when assembled, to contact crown portion 90 of load bearing outer races 44. In an example, the radius of curvature of the crown portion 90 in the transverse direction is smaller than the radius of curvature of the inner radial surface of the bearing outer race to housing intermediary load structure 52. This configuration allows the outer races to rock circumferentially with respect to the inner surface of the bearing outer race to housing intermediary load structure 52. In other examples, crown portion 90 is substantially flat as shown in FIG. 4.

Further, referring to FIGS. 1 and 6, the bearing outer race to housing intermediary load structure 52 encompasses and engages extension portions 80 of sleeve 48, 50 to assist in enclosing and protecting rolling element retainer structure 42. Although shown in a narrow width, the bearing outer race to housing intermediary load structure 52 may extend substantially the entire longitudinal length of the bearing assembly. The bearing outer race to housing intermediary load structure may be formed of a hard abrasion resistant material such as, for example, stainless steel or ceramic. Alternatively, a softer material such as bronze or aluminum may also be used.

Figure 7:
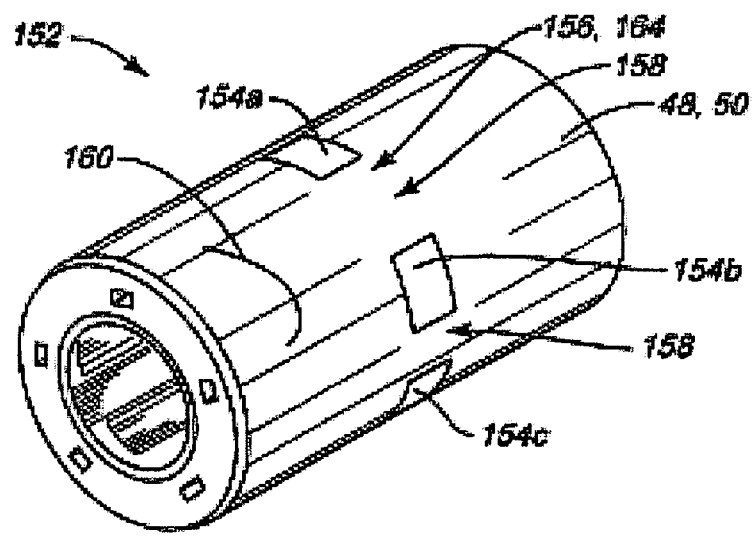
FIG. 7 is a perspective view of a linear motion bearing assembly.
Figure 8:
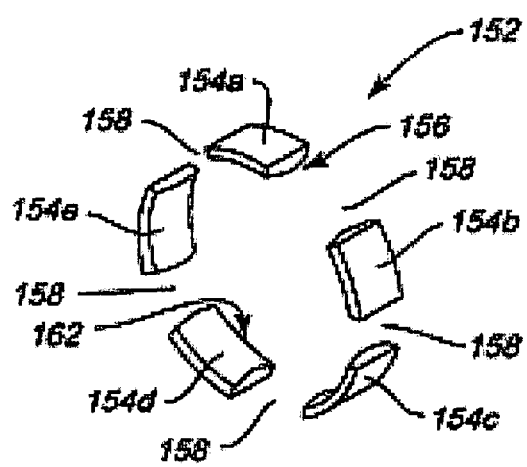
FIG. 8 is an exploded perspective view of a bearing outer race to housing intermediary load structure.

FIGS. 7 and 8 are perspective view drawings of another bearing outer race to housing intermediary load structure 152. Bearing outer race to housing intermediary load structure 54 in FIGS. 1-6 was substantially one piece and monolithic. Bearing outer race to housing intermediary load structure 152 is comprised of at least two discrete pieces 154 with spaces 158 in between pieces 154. Five pieces 154a, 154b, 154c, 154d, 154e are shown in FIG. 8 though any number of pieces could be used. Pieces 154 may be cylinders, spheres, flattened cylinders, spheroids, concavex diamonds, ellipsoids, pyramids, etc. An odd number of pieces may make it easier to tune bearing outer race to housing intermediary load structure 152. Pieces 154 may be distributed around a circumference of sleeve 48, 50 so that each space 158 between each piece 154 is of the same size. Sleeve 48, 50 may comprise multiple pieces or a single piece.

Each piece 154 has an internal arc with a radius of curvature 162 (FIG. 8) that corresponds to or is slightly larger than a radius of curvature 160 of outer housing sleeve 48, 50. The inventor has discovered that the tolerance accuracy needed to manufacture monolithic bearing outer race to housing intermediary load structure 52 (FIGS. 1-6), is quite high and therefore expensive to produce. In fact, a high percentage of manufactured pieces may need to be discarded because of the high necessary tolerance accuracies. If bearing outer race to housing intermediary load structure 52 includes dimensions too far removed from defined tolerances, excess unbalanced pressure may be placed on outer housing sleeve 48, 50 and then on bearing rolling elements 46 (FIG. 1).

In contrast, tolerance accuracy requirements are lower for bearing outer race to housing intermediary load structure 152 having multiple pieces 154. Each piece 154 requires less tolerance accuracy, which results in faster, less expensive manufacturing. Pieces 154 are less sensitive to twisting forces applied to outer housing sleeve 48, 50. Bearing outer race to housing intermediary load structure 152 is less sensitive to out of "roundness" from each piece 154. Less material is used for bearing outer race to housing intermediary load structure 152 and more manufacturing methods are available. Powder metal could be used to manufacture pieces 154.

A retention member 156 (best seen in FIG. 8) may be used to affix bearing outer race to housing intermediary load structure 152 to outer housing sleeve 48, 50. Retention member 156 could be, for example, a flare from each piece 154, a male extension, a female extension, etc. A corresponding mating retention member 164 may be disposed in outer housing sleeve 48, 50. Mating retention member 164 could be, for example, a recess, a female extension, a male extension etc.

Each piece 154 may be pliant and biased toward the position shown in the figures. In this way, to assemble, each piece 154 may be pinched and inserted into recesses 164 of outer housing sleeve 48, 50 so that flares 156 are bent inwardly. The bias causes piece 154 to resume the position shown to mate with recesses 158.

Figure 9:
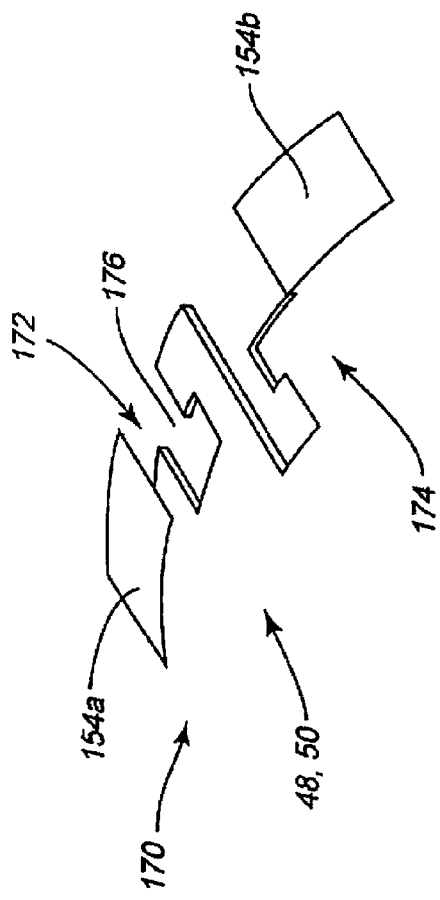
FIG. 9 is a perspective view of an interlock structure of a linear motion bearing assembly.

Reference now may be made to FIG. 9 where there is shown another structure that could be used to hold together linear motion bearing assembly 40. As shown, an interlock structure 170 may be formed on outer housing sleeves 48, 50 or on other sleeves used in a linear motion bearing assembly. One sleeve 48, 50 is shown in FIG. 9 for simplicity. Interlock structure 170 may be hermaphroditic including both male and female type structures. One interlock structure 170 may be formed on outer housing sleeve 48 and a second interlock structure 170 may be formed on outer housing sleeve 50. In this way, when outer housing sleeve 48 is moved along a longitudinal axis of linear motion bearing assembly 40, into engagement with outer housing sleeve 50, first interlock structure 170 is placed over and mates with second interlock structure 170 thereby holding linear motion bearing assembly 40 together. Interlock structures 170 may be placed around pieces 154a, 154b, of bearing outer race to housing intermediary load structure 152 discussed above so that pieces 154a, 154b may be disposed in a space 176 defined by walls of interlock structure 170.

Figure 10:
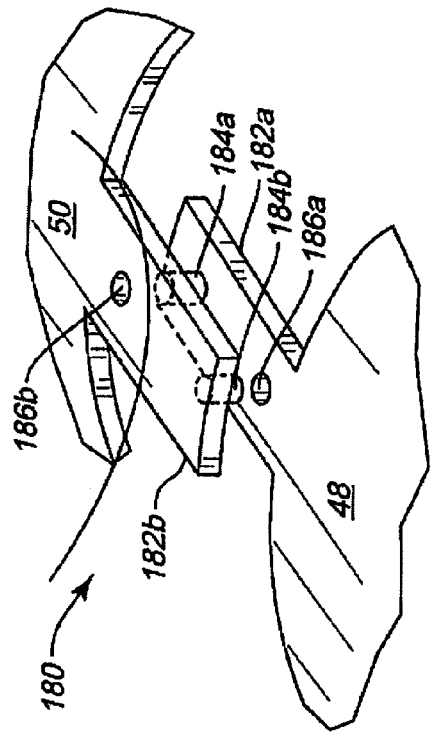
FIG. 10 is a perspective view of an interlock structure of a linear motion bearing assembly.

FIG. 10 shows another structure that could be used to hold together linear motion bearing assembly 40. As shown, an interlock structure 180 may be formed on outer housing sleeves 48, 50 or on other sleeves used in a linear motion bearing assembly. Interlock structure 180 may include a tab 182, a cylindrical protrusion 184, and a recess 186. Tab 182 may be, for example, rectangular in cross-section. Outer housing sleeve 48 may include one tab 182a and outer housing sleeve 50 may include a second tab 182b. In this way, when outer housing sleeve 48 is brought into engagement with outer housing sleeve 50, first interlock structure 180 is placed over second interlock structure 180, and tab 182a can be overlapped with tab 182b. Protrusion 184a can be placed into recess 186b and protrusion 184b can be placed into recess 186a thereby holding linear motion bearing assembly 40 together.

Interlock structure 170 and interlock structure 180 could both be used in a single linear motion bearing assembly 40—for example, on diametrically opposed sides. As interlock structure 170 includes the same structure on both outer housing sleeve 48 and 50, the production of linear motion bearing assembly 40 may be simplified. Only a single type of sleeve may be produced as the sleeves are interchangeable. Interlock structures 170, 180 prevent linear motion bearing assembly 40 from being pulled apart due to forces extending longitudinally outward away from a center of linear motion bearing assembly 40. Locking clips 72 (discussed above with reference to FIGS. 1-6) likely would not be able to resist such forces without interlock structures 170, 180. Interlock structures 170, 180 thus improve an integrity of linear motion bearing assembly 40.

Referring to FIGs. 11A, 11B and 11C there is shown a rail 200a/200b/200c which could be used in accordance with an embodiment of the disclosure. Rail 200a/200b/200c could be used with any of the linear motion bearing assembly structures mentioned above. Rail 200a/200b/200c includes a base portion 206a/206b/206c upon which a linear motion bearing assembly may be mated. Base portions 206a/206b/206c with a rectangular solid cross-section 206a, a diamond cross-section 206b and an hourglass cross-section 206c are shown. Base portion 206a/206b/206c includes recesses 202a/202b/

202c having a substantially half-circle cross-section and which extend along a length of rail 200a/200b/200c. Recesses 202a/202b/202c thus have a half-cylinder shape with a radius and circumference corresponding to, or slightly larger than, a radius and circumference of bearing balls 224a/224b/224c of a linear motion bearing assembly. Any number of recesses 202a/202b/202c may be used. Rail 200a/200b/200c may have a hollow interior to allow for receipt of a linear motion bearing assembly (shown in FIG. 12). Recesses 202a/202b/202c, with a radius and circumference corresponding to a radius and circumference of bearing balls elements 224a/224b/224c, thus provide a self-aligning functionality. When a linear motion bearing assembly is mated with rail 200a/200b/200c, the bearing assembly is easily aligned with rail 200a/200b/200c.

FIG. 12A shows an example of linear motion bearing system 250, including rail 200 mated with a linear motion bearing assembly 220 and FIG. 12B shows an example of the linear motion bearing assembly 220. For simplicity, in the figures, only some elements of linear motion bearing assembly 220 are shown. Any of the features discussed in the above linear motion bearing assemblies may be used with linear motion bearing assembly 220. For example, bearing plate to housing intermediary load structures 222 may be used. Bearing plate to housing intermediary load structures 222 may be placed at an inner race portion in hollow interior 204 of rail 200 as shown at 222b, or outer housing sleeve 248 exterior to rail 200 as shown at 222a, or at both locations.

Linear motion bearing assembly 220 includes bearing rolling elements 224 in a track 226. Bearing rolling elements 224 mate with recesses 202 of rail 200. In this way, linear motion bearing assembly 220 is easily and efficiently aligned with rail 200. Recesses 202 in rail 200 provide more give or flexibility in rail 200. Prior art systems are typically either very rigid and do not provide for self-alignment or are too flexible which detracts from accuracy. As shown in FIGS. 12A and 12B, races (both inner and outer) can self-align using outer race to housing intermediary load structures. This makes the product easier to use and more tolerant of mis-alignments without any significant loss of capability. The structure may also provide an improved performance over non-self-aligning designs. This self-alignment design, with outer race to housing intermediate load structures, can also be configured in the various rail shapes, layouts and configurations shown and described.

Figure 13:
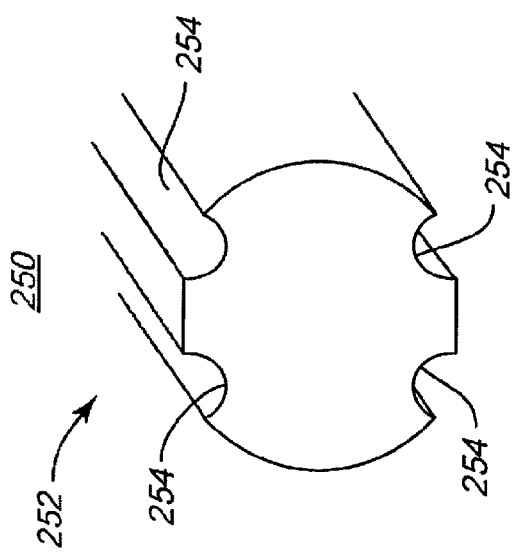
FIG. 13 is a perspective view of a rail, which could be used in accordance with an embodiment of the disclosure.

FIG. 13 shows another rail 250 which could be used in accordance with the disclosure. Rail 250, like rail 200 may be used with any of the linear motion bearing assemblies mentioned above. Rail 250 is in a spline configuration and includes a base 252 that is substantially cylindrical in shape. Base 252 includes recesses 254 having a substantially circle cross-section and which extend along a length of rail 250. Recesses 252 thus have a half-cylinder shape with a radius and circumference corresponding to a radius and circumference of bearing rolling elements 224 of a linear motion bearing assembly. Four recesses 254 are generally shown though any number may be used. Recesses 254, with a radius and circumference corresponding to a radius and circumference of bearing rolling elements, thus provide a self-aligning functionality. When a linear motion bearing assembly is mated with rail 250, the bearing assembly is easily aligned with rail 250.

Figure 14:
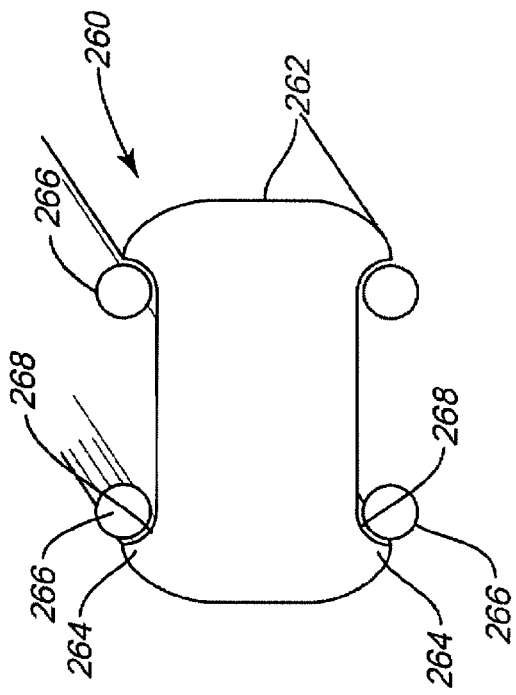
FIG. 14 is a perspective view of a rail, which could be used in accordance with an embodiment of the disclosure.

FIG. 14 shows another rail 260 which could be used in accordance with the disclosure. Rail 260, like rail 200 may be used with any of the linear motion bearing assemblies mentioned above. Rail 260 includes a base 262 that is a substantially a rectangular solid and includes hooked portions 264 which define substantially cylindrical defining recesses 268. Recesses 268 extend along a length of rail 260. Recesses 260 have a radius and circumference corresponding to a radius and circumference of bearing rolling elements 266 of a linear motion bearing assembly. Four recesses 268 are generally shown though any number may be used. Recesses 268, with a radius and circumference corresponding to a radius and circumference of bearing rolling elements 268, thus provide a self-aligning functionality. When a linear motion bearing assembly is mated with rail 260, the bearing assembly is easily aligned with rail 260.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A linear motion bearing system comprising:
a rolling element retainer structure having at least a portion of a plurality of open axial rolling element tracks formed therein, said rolling element tracks including an open load bearing portion, an open return portion and turn-arounds interconnecting the load bearing and return portions;
a plurality of bearing rolling elements disposed in the rolling element tracks;
a plurality of load bearing outer races axially positioned adjacent the rolling element retainer structure, the load bearing outer races effective to receive load from the rolling elements disposed in the load bearing portion of the rolling element tracks;
an outer housing sleeve effective to hold the plurality of load bearing outer races; and
a rail effective to mate with the rolling element retainer structure, the rail including at least one recess sized and shaped so as to be mateable with the rolling element retainer structure,
wherein the rail has a hollow interior effective to receive at least a portion of the rolling element retainer structure.

2. The linear motion bearing system as recited in claim 1, wherein the rail includes a base portion effective to mate with the rolling element retainer structure.

3. The linear motion bearing system as recited in claim 2, wherein the base portion is a rectangular solid.

4. The linear motion bearing system as recited in claim 3, wherein the rail includes hooked portions that define recesses, the recesses effective to mate with the bearing rolling elements.

5. The linear motion bearing system as recited in claim 2, wherein the base portion has a diamond cross-section.

6. The linear motion bearing system as recited in claim 2, wherein the base portion has an hourglass cross-section.

7. The linear motion bearing system as recited in claim 1, wherein the base portion has a cylindrical configuration.

8. The linear motion bearing system as recited in claim 1, wherein the base portion has a spline configuration.

9. The linear motion bearing system as recited in claim 1, wherein the recess has a half-circle cross-section and extends along a length of the rail.

10. The linear motion bearing system as recited in claim 9, wherein a radius and circumference of the recess corresponds to a radius and circumference of the bearing rolling elements.

11. The linear motion bearing system as recited in claim 1, wherein the recess has a half-cylinder shape.

12. The linear motion bearing system as recited in claim 1, wherein the radius and circumference of the recess corresponds to a radius and circumference of the bearing rolling elements.

13. The linear motion bearing system as recited in claim 1, further comprising a bearing outer race to housing intermediary load structure, the bearing outer race to housing intermediary load structure comprising a plurality of pieces and defining at least two spaces in between the pieces, the bearing outer race to housing intermediary load structure extending circumferentially around the outer housing sleeve.

14. The linear motion bearing system as recited in claim 13, wherein
   the rail has a hollow interior effective to receive at least a portion of the rolling element retainer structure; and
   the bearing outer race to housing intermediate load structure is placed at an inner race portion of the interior.

15. The linear motion bearing system as recited in claim 13, wherein
   the rail has a hollow interior effective to receive at least a portion of the rolling element retainer structure; and
   the bearing outer race to housing intermediate load structure is placed on an exterior of the rail.

\* \* \* \* \*